United States Patent
Boezen et al.

[11] Patent Number: 6,154,061
[45] Date of Patent: Nov. 28, 2000

[54] CAN BUS DRIVER WITH SYMMETRICAL DIFFERENTIAL OUTPUT SIGNALS

[75] Inventors: Hendrik Boezen; Martinus Bredius; Aloysius J. M. Boomkamp; Cecilius G. Kwakernaat; Abraham K. Van Den Heuvel, all of Nijmegen, Netherlands

[73] Assignee: U.S. Philips Corporation, New York, N.Y.

[21] Appl. No.: 09/304,596

[22] Filed: May 4, 1999

[30] Foreign Application Priority Data

May 6, 1998 [EP] European Pat. Off. .............. 98201476

[51] Int. Cl.[7] .............................................. H03K 19/0175
[52] U.S. Cl. .............................................. 326/86; 326/108
[58] Field of Search ................... 326/86, 21, 30, 326/108

[56] References Cited

U.S. PATENT DOCUMENTS

| | | | |
|---|---|---|---|
| 4,614,882 | 9/1986 | Parker et al. | 307/443 |
| 5,019,720 | 5/1991 | Skoog et al. | 307/270 |
| 5,635,852 | 6/1997 | Wallace | 326/30 |
| 5,729,152 | 3/1998 | Leung et al. | 326/21 |
| 5,977,796 | 11/1999 | Gabara | 326/86 |
| 6,025,742 | 2/2000 | Chan | 327/108 |

FOREIGN PATENT DOCUMENTS 0576444  1/1994  European Pat. Off. ....... H03K 17/16

*Primary Examiner*—David Nelms
*Assistant Examiner*—Thong Le
*Attorney, Agent, or Firm*—Leroy Eason

[57] ABSTRACT

Bus driver having a P-channel output transistor (T1) for driving a first bus terminal (6) from a positive supply terminal (2), an N-channel output transistor (T2) for driving a second bus terminal (12) from a negative supply terminal (4), a P-channel driver transistor (T3) and an N-channel driver transistor (T4) series connected between the positive (2) and the negative (4) supply terminal. The control electrodes of the P-channel transistors (T1, T3) are interconnected and the control electrodes of the N-channel transistors (T2, T4) are interconnected to obtain a fixed relationship between the currents through the P-channel transistors (T1, T3) and through the N-channel transistors (T2, T4). The conduction of the driver transistors (T3, T4) is controlled by two floating control voltage sources (22, 24) which are connected between the interconnection node (20) of the driver transistors (T3, T4) and the respective control electrodes of the driver transistors. Any difference between the current through the P-channel driver transistor (T3) and the N-channel driver transistor (T4) is compensated for by a change in the voltage level at the interconnection node (20). In this way the currents through the driver transistors (T3, T4), and also through the output transistors (T1, T2) which are scaled copies of the driver transistors, are always equal and a highly symmetrical driving of the two bus wires (8, 14) is obtained. As a result, the electromagnetic radiation of the bus wires is low.

8 Claims, 4 Drawing Sheets

CAN BUS DRIVER WITH SYMMETRICAL DIFFERENTIAL OUTPUT SIGNALS

BACKGROUND OF THE INVENTION

1. Field of the Invention

The invention relates to a bus driver for transmitting data signals via wires of a bus, which bus driver comprises:

a first supply terminal and a second supply terminal for the connection of a supply voltage for the bus driver, a first bus terminal and a second bus terminal for the connection of respective wires of the bus, a first transistor of a first conductivity type having a first main current path connected between the first supply terminal and the first bus terminal and having a first control electrode, a second transistor of a second conductivity type opposite to the first conductivity type having a second main current path connected between the second supply terminal and the second bus terminal and having a second control electrode, and drive means for driving the first control electrode and the second control electrode.

2. Description of the Related Art

Such a bus driver is known from European Patent Specification EP 0 576 444 and is used in so-called Controller Area Network (CAN) bus systems which are used, inter alia, in cars. For this, use is made of transceivers (transmitter/receiver), information being transmitted as a differential signal via a two-wire bus having its two wires connected to the first and the second bus terminal. The transmitter supplies data signals to the bus and is from now on referred to as bus driver. The two bus wires are usually referred to as CANH and CANL and are connected to a pull-down resistor and a pull-up resistor at the receiver side. The voltages across the two bus wires have opposite polarities, as a result of which the spurious electromagnetic fields radiated by the two wires cancel one another. In the case of a high degree of symmetry the bus wires can take the form of a twisted pair and no expensive shielding is necessary. For this purpose the symmetry of the signals on the two bus wires should be as high as possible.

SUMMARY OF THE INVENTION

It is an object of the invention to provide a bus driver having an optimum symmetry. To this end, the bus driver of the type defined in the opening paragraph is characterized in that the drive means comprise:

a common node, a third transistor of the first conductivity type having a third main current path connected between the first supply terminal and the common node and having a third control electrode coupled to the first control electrode, a fourth transistor of the second conductivity type having a fourth main current path connected between the second supply terminal and the common node and having a fourth control electrode coupled to the second control electrode, a first control voltage source connected between the third control electrode and the common node, and a second control voltage source connected between the fourth control electrode and the common node.

At rest, i.e. when no data signals are transmitted, the first and the second control voltage source have such a polarity and amplitude that the third and the fourth transistor and, consequently, also the first and the second transistor are currentless. In a drive situation, i.e. when data signals are transmitted, the polarity of the first and the second control voltage source is reversed and the third and the fourth transistor are turned on. If the current through the third transistor tends to become larger than the current through the fourth transistor the voltage on the common node is set to another value, as a result of which the drive of the third transistor decreases and that of the fourth transistor increases. The voltage across the main current path is set to such a value that the currents through the third and the fourth transistor are always equal. Preferably, the first and the second transistor are scaled copies of the third and the fourth transistor, as a result of which also the currents supplied to the bus wires by the bus driver are always equal.

The first and the second control voltage source are floating with respect to the first and the second supply terminal. In accordance with the invention these control voltage sources can be implemented so as to have the characteristic features as defined in claim 2. The floating control voltage sources are realized by means of two floating resistors driven from two floating control current sources via current mirrors.

In accordance with the invention the two floating control current sources can be implemented so as to have the characteristic features as defined in claim 3. The control current sources comprise a differential pair and a bias current source whose current is divided in response to the control signals on the first and the second control terminal.

The control signals are supplied by a drive circuit which preferably supplies such a control signal that, on the one hand, a minimal delay is produced between variations in the data signal to be transmitted and the signals on the bus wires and, on the other hand, it is avoided that steep edges are produced on the bus wires and give rise to an unnecessary increase in electromagnetic radiation. In accordance with the invention drive circuits having these qualities have the characteristic features as defined in claims 4 and 5. These drive circuits supply such control voltages that threshold voltages in the transistors to be driven are overstepped comparatively rapidly.

BRIEF DESCRIPTION OF THE DRAWINGS

These and other aspects of the invention will be described and elucidated with reference to the accompanying drawings, in which.

In these Figures parts having a like function or purpose bear the same reference symbols.

DESCRIPTION OF THE PREFERRED EMBODIMENTS

Figure 1:
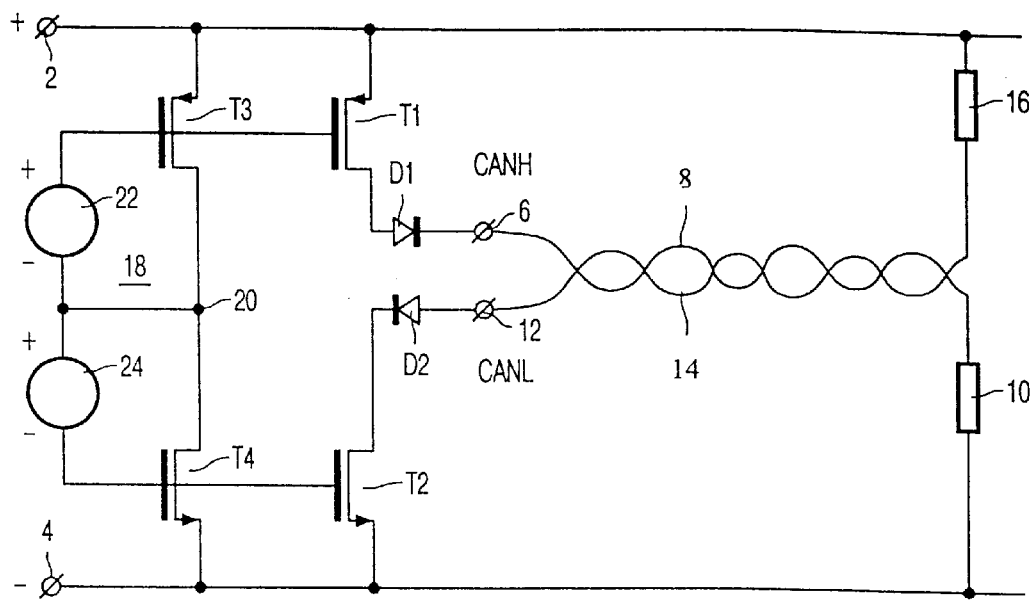
FIG. 1 shows a first embodiment of a bus driver in accordance with the invention.

FIG. 1 shows a bus driver in accordance with the invention which can form part of a transceiver (transmitter/ receiver) in a two-wire bus system. The driver is powered with a supply voltage applied to a positive supply terminal 2 and a negative supply terminal 4. The driver has a first bus terminal 6 for supplying the signal CANH to a first wire 8 of the bus, which first wire is connected to the negative supply terminal 4 via a pull-down resistor 10. There is also a second bus terminal 12 for supplying the signal CANL to a second wire 14 of the bus, which second wire is connected to the positive supply terminal 2 via a pull-up resistor 16. The wires 8 and 14 have been twisted together to form a twisted pair and, if required, they may be provided with a shielding. The bus terminal 6 is coupled to the positive supply terminal 2 via the main current path of a PMOS transistor T1. An optional diode is arranged between the drain of the transistor T1 and the bus terminal 6 to prevent a current through the parasitic body diode of the transistor T1 with the driver current cut off. The other bus terminal 12 is coupled to the negative supply terminal 4 via the main current path of an NMOS transistor T2. Another optional diode is arranged between the drain of the transistor T2 and the bus terminal 6 to prevent a current through the parasitic body diode of the transistor T2 with the driver current cut off. The transistor T1 and the transistor T2 are driven by drive means 18 which comprise a PMOS transistor T3 having its main current path connected between the positive supply terminal 2 and a common node 20, an NMOS transistor T4 having its main current path connected between the common node 20 and the negative supply terminal 4, a first control voltage source 22 connected between the control electrode, in the present case the gate, of the transistor T3 and the common node 20, and a second control voltage source 24 connected between the control electrode of the transistor T4 and the common node 20. Furthermore, the transistors T1 and T3 have their control electrodes interconnected and the transistors T4 and T2 have their control electrodes interconnected. The voltages of the control voltage sources 22 and 24 are switched over under command of the data signals to be transmitted.

At rest, i.e. when no data signals are to be transmitted via the bus, the control voltage sources each supply a voltage of +2.5 V. It is then assumed that the supply voltage is 5 V. In that case the transistors T3 and T4 are not conductive and, consequently, the transistors T1 and T2 are not conductive either. In a driven state, i.e. if there are data signals to be transmitted via the bus, the voltages of the control voltage sources 22 and 24 are reversed in polarity from +2.5 V to −2.5 V. As a result of this, the transistors T3 and T4 and, consequently, also the transistors T1 and T2 are driven into conduction. If the current through the transistor T3 tends to become larger than the current through the transistor T4, the voltage on the common node 20 increases. As a result of this, the gate-source voltage of the transistor T3 decreases and the gate-source voltage of the transistor T4 increases, so that the difference in current through the transistors T3 and T4 is eliminated. Owing to the floating control voltage sources 22 and 24 the voltage on the common node 20 is controlled so as to equalize the drain currents of the transistors T3 and T4. Since the transistors T1 and T2 are scaled copies of the transistors T3 and T4 the drain currents of the transistors T1 and T2 are also equal to one another. Making scaled copies is very well possible in an integrated circuit but it is likewise possible by means of matched discrete transistors.

Figure 2:
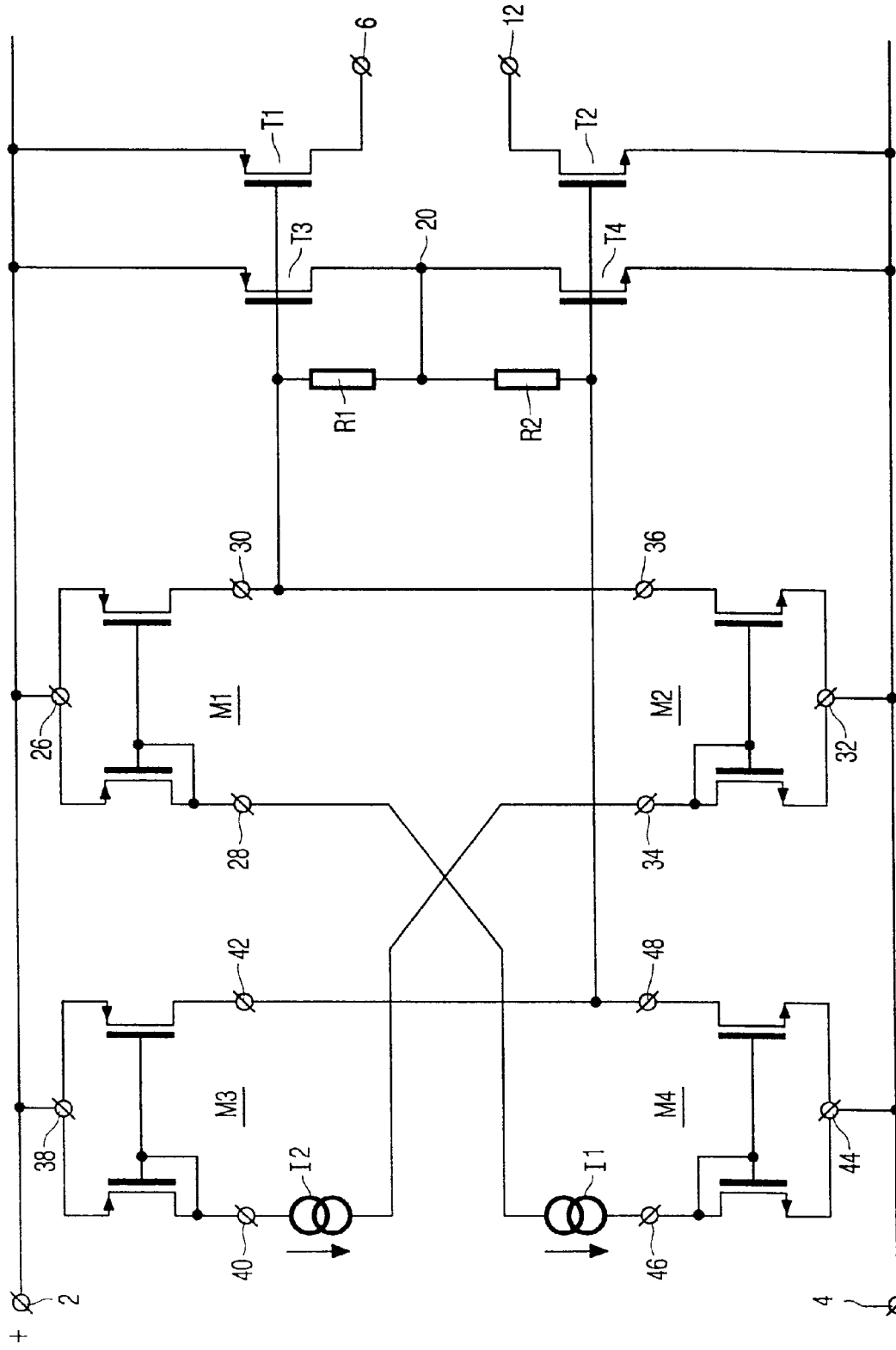
FIG. 2 shows a second embodiment of a bus driver in accordance with the invention.

FIG. 2 shows a bus driver with a practical implementation of the floating control voltage sources by means of two resistors R1 and R2 and two control current sources I1 and I2 which are coupled to the resistors R1 and R2 via current mirrors M1, M2, M3 and M4. The first resistor R1 is connected between the control electrode of the transistor T3 and the common node 20 and the second resistor R2 is connected between the common node 20 and the control electrode of the transistor T4. The first current mirror M1 has a common terminal 26 coupled to the positive supply terminal 2, an input terminal 28, and an output terminal 30. The second current mirror M2 has a common terminal 32 coupled to the negative supply terminal 4, an input terminal 34, and an output terminal 36. The output terminal 30 of the first current mirror M1 and the output terminal 36 of the second current mirror M2 are connected to one another and also to the gates of the transistors T3 and T1. The third current mirror M3 has a common terminal 38 coupled to the positive supply terminal 2, an input terminal 40, and an output terminal 42. The fourth current mirror M4 has a common terminal 44 coupled to the negative supply terminal 4, an input terminal 46, and an output terminal 48. The output terminal 42 of the third current mirror M3 and the output terminal 48 of the fourth current mirror M4 are connected to one another and also to the gates of the transistors T4 and T2. The control current source I1 is connected between the input terminal 46 of the fourth current mirror M4 and the input terminal 28 of the first current mirror M1. The control current source I2 is connected between the input terminal 40 of the third current mirror M3 and the input terminal 34 of the second current mirror M2. The resistors R1 and R2 have a resistance value of 1 kohm.

At rest the current of the control current source I1 is approximately 2.5 mA and the current of the control current source I2 is zero. The voltage on the gates of the transistors T3 and T2 is then approximately 5 V (again on the assumption that the supply voltage is 5 V) and the voltage on the gates of the transistors T4 and T2 is then 0 V. The transistors T3, T1, T4 and T2 are then all cut off. In a driven state the current of the control current source I1 changes from 2.5 mA to zero and the current of the control current source I2 changes from zero to approximately 2.5 mA. The currents through the resistors R1 and R2 then change signs and the voltage on the gates of the transistors T3 and T1 become 0 V and that on the gates of the transistors T4 and T2 becomes 5 V. The transistors T3, T1, T4 and T2 are now all conductive.

The current mirrors M1 and M3 are formed by means of two PMOS transistors, one of them being connected as a diode, which means that it has its drain and gate interconnected. The main current path of the diode-connected transistor is arranged between the common terminal and the input terminal, the main current path of the other transistor being arranged between the common terminal and the output terminal of the relevant current mirror. The current mirrors M2 and M4 are similar design but use NMOS transistors.

Figure 3:
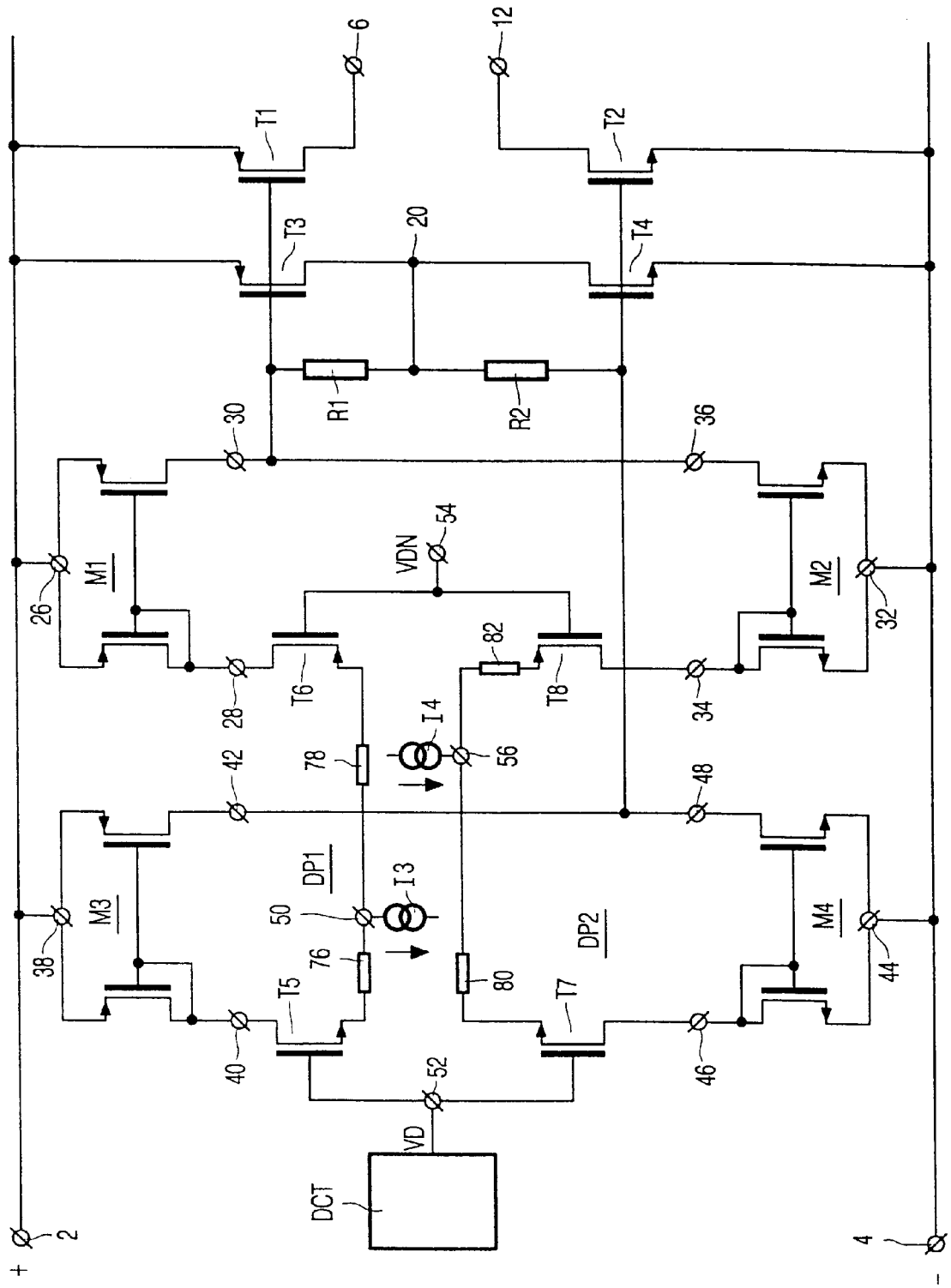
FIG. 3 shows a third embodiment of a bus driver in accordance with the invention.

FIG. 3 shows an implementation of the control current sources I1 and I2 by means of two differential transistor pairs DP1 and DP2 and bias current sources I3 and I4. The first transistor pair DP1 comprises two NMOS transistors T5 and T6. The transistor T5 has its main current path connected between the input terminal 40 of the third current mirror M3 and a first node 50. The transistor T6 has its main current path connected between the input terminal 28 of the first current mirror M1 and the first node 50, the first bias current source I3 being also connected to this node 50. The transistor T5 has its control electrode connected to a first control terminal 52, which receives a control voltage VD from a driver circuit DCT. The other transistor T6 has its gate connected to a second control terminal 54, which receives an inverse control voltage VDN from a second driver circuit (not shown) which is identical to the first-mentioned driver circuit DCT.

It is to be noted that one of the two control terminals 52 and 54 can be connected to a fixed reference voltage of approximately half the supply voltage in order to obtain the same effect.

The second transistor pair DP2 comprises two PMOS transistors T7 and T8. The transistor T7 has its main current path connected between the input terminal 46 of the fourth current mirror M4 and a second node 56. The transistor T8 has its main current path connected between the input terminal 34 of the second current mirror M2 and the second node 56, the second bias current source 14 being also connected to this node 56. The transistor T7 has its control electrode connected to the first control terminal 52 and the transistor T8 has its gate connected to the second control terminal 54.

If the control voltage VD is low and the control voltage VDN is high the current of the bias current source I3 flows through the transistor T6 and the current of the bias current source I4 through the transistor T7. Via the current mirrors M1 and M4 current flows from the output terminal 30 of the current mirror M1 to the output terminal 48 of the current mirror M4 via the resistors R1 and R2. The voltages on the gates of the transistors T3 and T1 are high, so that these transistors are not conductive. The voltages on the gates of the transistors T4 and T1 are low, so that these transistors are not conductive either. Now the bus is not active.

When the control voltage VD is high and the control voltage VDN is low the current of the bias current source I3 flows through the transistor T5 and the current of the bias current source I4 flows through the transistor T8. Via the current mirrors M3 and M2 current flows from the output terminal 42 of the current mirror M3 to the output terminal 36 of the current mirror M2 via the resistors R2 and R1. The voltages on the gates of the transistors T3 and T1 are now low, so that these transistors are conductive. The voltages on the gates of the transistors T4 and T1 are now high, so that these transistors are also conductive. Now the bus is active.

Resistors 76, 78, 80 and 82 may be arranged in series with the source electrodes of the transistors T5, T6, T7 and T8 in order to reduce the transconductance of the differential pairs DP1 and DP2 and in order to achieve a more gradual change-over.

Preferably, the driver circuit DCT is designed in such a manner that the control voltage VD varies slowly, as a result of which no rapid variations of the bus signals CANH and CANL occur and the electromagnetic radiation is consequently low. A disadvantage of this approach is that, as a result of this, the delay increases and the maximum attainable bit rate of the bus decreases. There is no change on the bus terminals 6 and 12 until the voltages on the gates of the transistors T3/T1 and T4/T1 are higher than the threshold voltages of these transistors. Switching on then proceeds rapidly until the drain-source voltages of the transistors T1 and T2 become low (triode region). The signals CANH and CANL then increase again slowly.

Figure 4:
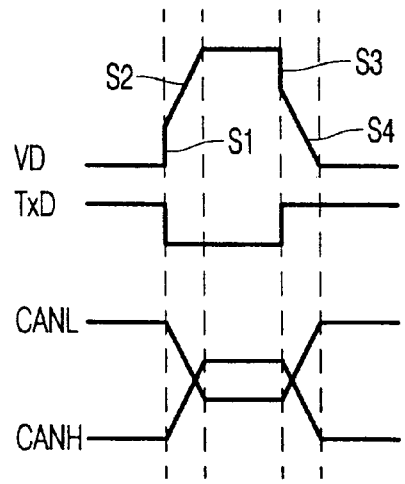
FIG. 4 shows drive signals generated by a driver circuit for use in a bus driver in accordance with the invention.

In order to obtain gradual edges and a minimal delay the control voltage VD, see FIG. 4, should first increase rapidly (slope s1) until just below the threshold voltage and should subsequently increase slowly (slope s2) in order to obtain a gradual leading edge. In the opposite direction the control voltage VD should first decrease rapidly (slope s3) until the transistors T1 and T2 leave the triode region, after which it should decrease slowly again (s4) in order to obtain a gradual trailing edge.

Figure 5:
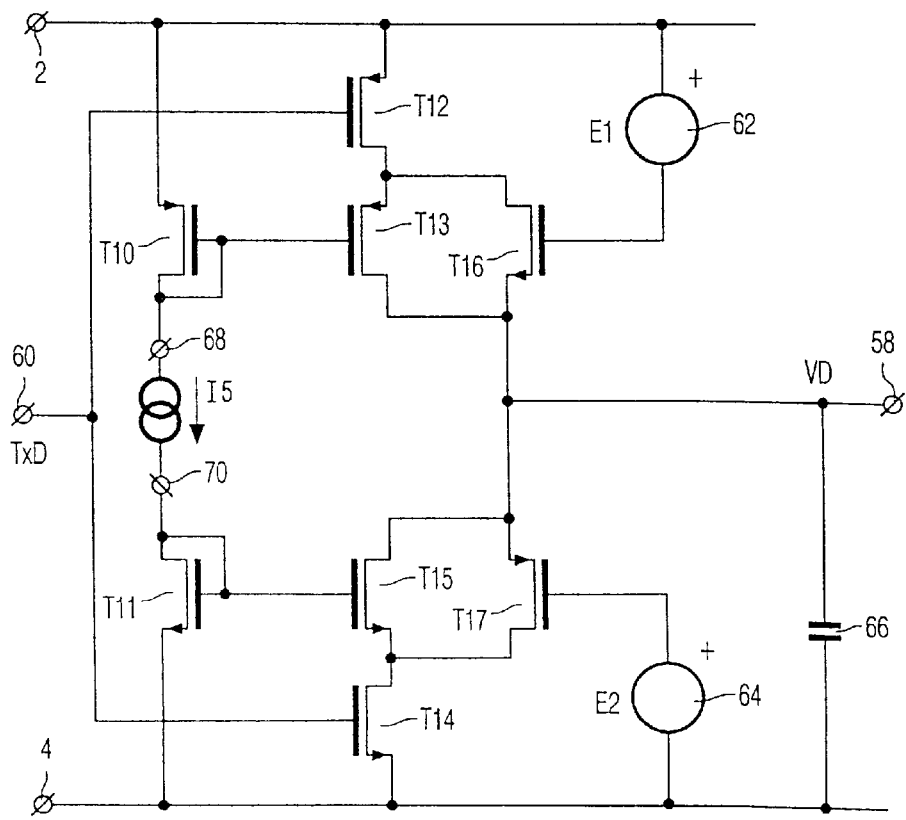
FIG. 5 shows a first driver circuit for use in a bus driver in accordance with the invention.

FIG. 5 shows a first implementation of the driver circuit DCT which meets the afore-mentioned requirements imposed on the control voltage VD. The driver circuit DCT has a drive circuit output terminal 58 connected to the control terminal 52 or the control terminal 54; a data input terminal 60 for receiving a data signal TxD; a bias current source I5; a first bias voltage source 62 and second bias voltage source 64; a capacitance 66 connected between the drive circuit output terminal 58 and the negative supply terminal 4. The capacitance 66 may alternatively be connected to the other supply terminal 2. The circuit further comprises a diode-connected PMOS transistor T10 having a main current path connected between the positive supply terminal 2 and a first terminal 68 of the bias current source I5, as well as a diode-connected NMOS transistor T11 having a main current path connected between the negative supply terminal 4 and a second terminal 70 of the bias current source I5. Moreover, it comprises a PMOS transistor T12 and a PMOS transistor T13 having their main current paths arranged in series between the positive supply terminal 2 and the drive circuit output terminal 58, the source electrode of the transistor T12 being connected to the positive supply terminal 2 and the drain electrode of the transistor T13 being connected to the drive circuit output terminal 58. The transistor T12 has its control electrode connected to the data input terminal 60 and the transistor T13 has its control electrode connected to the control electrode of the transistor T10. The driver circuit further includes an NMOS transistor T14 and an NMOS transistor T15 having their main current paths arranged in series between the negative supply terminal 4 and the drive circuit output terminal 58, the transistor T14 having its source electrode connected to the negative supply terminal 4 and the transistor T15 having its drain electrode connected to the drive circuit output terminal 58. The transistor T14 has its control electrode connected to the data input terminal 60 and the transistor T15 has its control electrode of the second transistor T11. The drive circuit DCT further comprises an NMOS transistor T16 having a main current path arranged in parallel with the main current path of the transistor T13 and having a control electrode connected to the first bias voltage source 62, and a PMOS transistor T17 having a main current path arranged in parallel with the main current path of the transistor T15 and having a control electrode connected to the second bias voltage source 64.

When the data signal TxD is high the capacitance 66 is discharged with a constant current via the transistor T15. When the data signal TxD is low the transistor T14 interrupts the discharge current. The transistor T12 then conducts and the transistor T16 assures that the capacitance 66 is charged rapidly to a voltage which is determined by the voltage E1 of the first bias voltage source 62 and the threshold voltage of the transistor T16. After this, the capacitance 66 is charged further slowly with a constant current via the transistor T13. When the data signal TxD rises again the capacitance 66 is first discharged rapidly via the transistor T17 and is subsequently discharged slowly via the transistor T15. In this way a control voltage VD is built up having a waveform as shown in FIG. 4.

Figure 6:
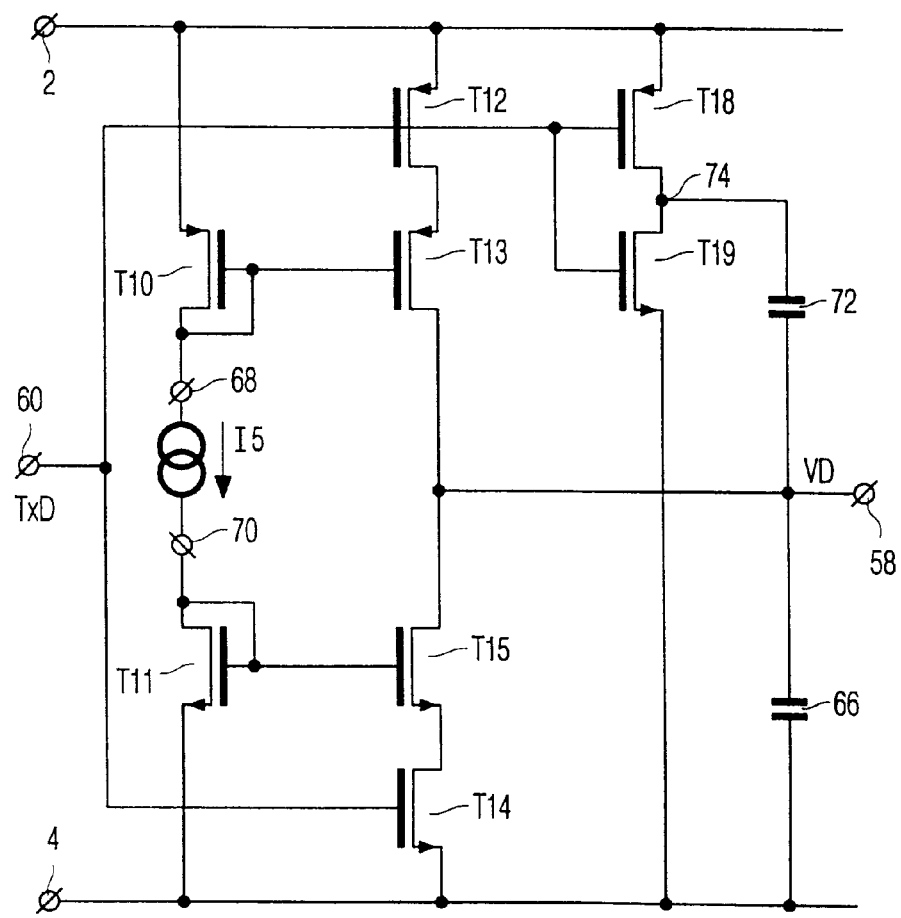
FIG. 6 shows a second driver circuit for use in a bus driver in accordance with the invention.

FIG. 6 shows an alternative implementation of the driver circuit DCT. In this circuit the transistors T16 and T17 and the bias voltage sources 62 and 64 have been dispensed with. Instead of these, a PMOS transistor T18 and an NMOS transistor T19, which together form an inverter, and a second capacitance 72 have been added. The transistors T18 and T19 are arranged in series between the positive supply terminal 2 and the negative supply terminal 4, the drains of the transistors T18 and T19 being commoned in an interconnection node 74. The second capacitance 72 is connected between the interconnection node 74 and the drive circuit output terminal 58. The control electrodes of the transistors T18 and T19 are both connected to the data input terminal 60.

When the data signal TxD is high the drive circuit output terminal 58 is discharged with a constant current via the transistor T15. The capacitance 72 is then charged to the supply voltage. When the data signal TxD goes low the interconnection node 74 goes high and a voltage step equal to the supply voltage multiplied by a factor C2/(C1+C2) appears on the drive circuit output terminal 58, C1 and C2 being the values of the first capacitance 66 and the second capacitance 72. After this, the drive circuit output terminal 58 is charged with a constant current via the transistor T13. This again results in a control voltage VD having a waveform as shown in FIG. 4. The advantage of this implementation is that the voltage step in the control voltage VD is dependent on an (accurate) capacitance ratio and not on the voltages of the bias voltage sources.

Instead of the unipolar MOS transistors shown herein bipolar transistors can be used, in which case drain, source and gate should read emitter, collector and base, respectively.

What is claimed is:

1. A bus driver for transmitting data signals via wires of a bus, which bus driver comprises:
   a first supply terminal (2) and a second supply terminal (4) for the connection of a supply voltage for the bus driver,
   a first bus terminal (6) and a second bus terminal (12) for the connection of respective wires (8, 14) of the bus,
   a first transistor (T1) of a first conductivity type having a first main current path connected between the first supply terminal (2) and the first bus terminal (6) and having a first control electrode,
   a second transistor (T2) of a second conductivity type opposite to the first conductivity type having a second main current path connected between the second supply terminal (4) and the second bus terminal (12) and having a second control electrode, and
   drive means (18) for driving the first control electrode and the second control electrode,
   characterized in that the drive means (18) comprise:
      a common node (20),
      a third transistor (T3) of the first conductivity type having a third main current path connected between the first supply terminal (2) and the common node (20) and having a third control electrode coupled to the first control electrode,
      a fourth transistor (T4) of the second conductivity type having a fourth main current path connected between the second supply terminal (4) and the common node (20) and having a fourth control electrode coupled to the second control electrode,
      a first control voltage source (22) connected between the third control electrode and the common node (20), and
      a second control voltage source (24) connected between the fourth control electrode and the common node (20).

2. A bus driver as claimed in claim 1, characterized in that the first control voltage source (22) and the second control voltage source (24) comprise:
   a first resistor (R1) connected between the common node (20) and the third control electrode,
   a second resistor (R2) connected between the common node (20) and the fourth control electrode,
   a first current mirror (M1) having a first common terminal (26) coupled to the first supply terminal (2), a first input terminal (28), and a first output terminal (30) coupled to the third control electrode,
   a second current mirror (M2) having a second common terminal (32) coupled to the second supply terminal (4), a second input terminal (34), and a second output terminal (36) coupled to the first output terminal (30),
   a third current mirror (M3) having a third common terminal (38) coupled to the first supply terminal (2), a third input terminal (40), and a third output terminal (42) coupled to the fourth control electrode,
   a fourth current mirror (M4) having a fourth common terminal (44) coupled to the second supply terminal (4), a fourth input terminal (46), and a fourth output terminal (48) coupled to the third output terminal (42),
   a first control current source (I1) connected between the first input terminal (28) and the fourth input terminal (46), and
   a second control current source (I2) connected between the third input terminal (40) and the second input terminal (34).

3. A bus driver as claimed in claim 2, characterized in that the first control current source (I1) and the second control current source (I2) comprise:
   a first control terminal (52) and a second control terminal (54) for receiving respective control signals,
   a first differential transistor pair (DP1) comprising transistors of the second conductivity type each having a main current path and a control electrode, the main current path of the one transistor (T5) of the first transistor pair (DP1) being connected between a first node (50) and the third input terminal (40) and the main current path of the other transistor (T6) of the first transistor pair (DP1) being connected between the first node (50) and the first input termninal (28), and the control electrode of the one transistor (T5) of the first transistor pair (DP1) being connected to the first control terminal (52) and the control electrode of the other transistor (T6) of the first transistor pair (DP1) being connected to the second control termninal (54),
   a first bias current source (I3) coupled to the first node (50),
   a second differential transistor pair (DP2) comprising transistors of the first conductivity type each having a main current path and a control electrode, the main current path of the one transistor (T7) of the second transistor pair (DP2) being connected between a second node (56) and the fourth input terminal (46) and the main current path of the other transistor (T8) of the second transistor pair (DP2) being connected between the second node (56) and the second input terminal (34), and the control electrode of the one transistor (T7) of the second transistor pair (DP2) being connected to the first control terminal (52) and the control electrode of the other transistor (T8) of the second transistor pair (DP2) being connected to the second control terminal (54), and
   a second bias current source (I4) coupled to the second node (56).

4. A bus driver as claimed in claim 3, characterized in that the drive means (18) comprise a drive circuit (DCT) for supplying the control signals to at least one control terminal (52) of the first control terminal (52) and the second control terminal (52), the drive circuit (DCT) comprising:
   a drive circuit output terminal (58) coupled to the at least one control terminal (52),
   a data input terminal (60) for receiving a data signal,
   a bias current source (I5),
   means (62, 64) for supplying a first bias voltage (E1) and a second bias voltage (E2),
   a capacitance (66) connected between the drive circuit output terminal (58) and the first supply terminal (2) or the second supply terminal (4),
   a diode-connected first transistor (T10) of the first conductivity type having a control electrode and having a main current path connected between the first supply terminal (2) and a first terminal (68) of the bias current source (I5), a diode-connected second transistor (T11) of the second conductivity type having a control electrode and having a main current path connected between the second supply terminal (4) and a second terminal (70) of the bias current source (I5), a third transistor (T12) and a fourth transistor (T13) of the first conductivity type each having a main current path and a control electrode, the main current path of the third transistor (T12) and the main current path of the fourth transistor (T13) being arranged in series between the first supply terminal (2) and the drive circuit output terminal (58), the main current path of the third transistor (T12) being connected to the first supply terminal (2) and the main current path of the fourth transistor (T13) being connected to the drive circuit output terminal (58), and the control electrode of the third transistor (T12) being connected to the data input terminal (60) and the control electrode of the fourth transistor (T13) being connected to the control electrode of the first transistor (T10), a fifth transistor (T14) and a sixth transistor (T15) of the second conductivity type each having a main current path and a control electrode, the main current path of the fifth transistor (T14) and the main current path of the sixth transistor (T15) being arranged in series between the second supply terminal (4) and the drive circuit output terminal (58), the main current path of the fifth transistor (T14) being connected to the second supply terminal (4) and the main current path of the sixth transistor (T15) being connected to the drive circuit output terminal (58), and the control electrode of the fifth transistor (T14) being connected to the data input terminal (60) and the control electrode of the sixth transistor (T15) being connected to the control electrode of the second transistor (T11), a seventh transistor (T16) of the second conductivity type having a main current path arranged in parallel with the main current path of the fourth transistor (T13), and having a control electrode arranged to receive the first bias voltage (E1), and an eighth transistor (T17) of the first conductivity type having a main current path arranged in parallel with the main current path of the sixth transistor (T15), and having a control electrode arranged to receive the second bias voltage (E2).

5. A bus driver as claimed in claim 3, characterized in that the drive means (18) comprise a drive circuit (DCT) for supplying the control signals to at least one control terminal (52) of the first control terminal (52) and the second control terminal (52), the drive circuit (DCT) comprising:

a drive circuit output terminal (58) coupled to the at least one control terminal (52), a data input terminal (60) for receiving a data signal, a bias current source (I5), a diode-connected first transistor (T10) of the first conductivity type having a control electrode and having a main current path connected between the first supply terminal (2) and a first terminal (68) of the bias current source (I5), a diode-connected second transistor (T11) of the second conductivity type having a control electrode and having a main current path connected between the second supply terminal (4) and a second terminal (70) of the bias current source (I5), a third transistor (T12) and a fourth transistor (T13) of the first conductivity type each having a main current path and a control electrode, the main current path of the third transistor (T12) and the main current path of the fourth transistor (T13) being arranged in series between the first supply terminal (2) and the drive circuit output terminal (58), the main current path of the third transistor (T12) being connected to the first supply terminal (2) and the main current path of the fourth transistor (T13) being connected to the drive circuit output terminal (58), and the control electrode of the third transistor (T12) being connected to the data input terminal (60) and the control electrode of the fourth transistor (T13) being connected to the control electrode of the first transistor (T10), a fifth transistor (T14) and a sixth transistor (T15) of the second conductivity type each having a main current path and a control electrode, the main current path of the fifth transistor (T14) and the main current path of the sixth transistor (T15) being arranged in series between the second supply terminal (4) and the drive circuit output terminal (58), the main current path of the fifth transistor (T14) being connected to the second supply terminal (4) and the main current path of the sixth transistor (T15) being connected to the drive circuit output terminal (58), and the control electrode of the fifth transistor (T14) being connected to the data input terminal (60) and the control electrode of the sixth transistor (T15) being connected to the control electrode of the second transistor (T11), a seventh transistor (T16) of the first conductivity type and an eighth transistor (T19) of the second conductivity type each having a main current path and a control electrode, the main current path of the seventh transistor (T18) and the main current path of the eighth transistor (T19) being arranged in series between the first supply terminal (2) and the second supply terminal (4), the main current path of the seventh transistor (T18) being connected between the first supply terminal (2) and an interconnection node (74) and the main current path of the eighth transistor (T19) being connected between the second supply terminal (4) and the interconnection node (74), and the control electrode of the seventh transistor (T18) and the control electrode of the eighth transistor (T19) being connected to the data input terminal (60), a first capacitance (66) connected between the drive circuit output terminal (58) and the first supply terminal (2) or the second supply terminal (4), a second capacitance (72) connected between the drive circuit output terminal (58) and the interconnection node (74).

6. A bus driver as claimed in claim 1, characterized in that the third transistor (T3) is a scaled copy of the first transistor (T1) and the fourth transistor (T4) is a scaled copy of the second transistor (T2).

7. A bus driver as claimed in claim 1, characterized in that a first diode (D1) is arranged between the first main current path and the first bus terminal (6) and a second diode (D2) is arranged between the second main current path and the second bus terminal (12).

8. A bus driver as claimed in claim 3, characterized in that the respective main current paths of the transistors (T5, T6, T7, T8) of the first (DP1) and the second (DP2) transistor pair are connected to the first (50) and the second (56) node, respectively, via respective resistors (76, 78, 80, 82).

* * * * *